US010581642B2

(12) United States Patent
Jitsukawa

(10) Patent No.: US 10,581,642 B2
(45) Date of Patent: Mar. 3, 2020

(54) TRANSMISSION CONTROL DEVICE, RADIO COMMUNICATION SYSTEM, AND RADIO RESOURCE ALLOCATION METHOD

(71) Applicant: FUJITSU LIMITED, Kawasaki-shi, Kanagawa (JP)

(72) Inventor: Daisuke Jitsukawa, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 16/004,037

(22) Filed: Jun. 8, 2018

(65) Prior Publication Data
US 2018/0367345 A1 Dec. 20, 2018

(30) Foreign Application Priority Data
Jun. 15, 2017 (JP) ................................ 2017-118101

(51) Int. Cl.
H04L 25/02 (2006.01)
H04L 5/00 (2006.01)
H04L 25/03 (2006.01)

(52) U.S. Cl.
CPC ........ *H04L 25/0224* (2013.01); *H04L 5/0003* (2013.01); *H04L 5/0005* (2013.01); *H04L 5/0012* (2013.01); *H04L 5/0039* (2013.01); *H04L 5/0044* (2013.01); *H04L 5/0048* (2013.01); *H04L 25/0398* (2013.01); *H04L 5/0007* (2013.01)

(58) Field of Classification Search
None
See application file for complete search history.

(56) References Cited

U.S. PATENT DOCUMENTS

| 2003/0227931 | A1* | 12/2003 | Chen | ................... | H04L 12/4633 370/408 |
| 2011/0003599 | A1 | 1/2011 | Kanzaki et al. | | |
| 2012/0224554 | A1* | 9/2012 | Park | ...................... | H04L 5/0035 370/329 |
| 2014/0269554 | A1* | 9/2014 | Shapira | .............. | H04B 17/0085 370/329 |
| 2014/0302868 | A1 | 10/2014 | Miki et al. | | |

(Continued)

FOREIGN PATENT DOCUMENTS

JP 2011-015318 A 1/2011
JP 2013-542672 A 11/2013
(Continued)

OTHER PUBLICATIONS

Jitsukawa D., et al., "Study of Inter-Transmission Point Calibration Scheme for 5G Ultra High-Density Distributed Antenna Systems", The Institute of Electronics, Information and Communication Engineers, RCS2016-142, Aug. 2016.

*Primary Examiner* — Kevin C. Harper
*Assistant Examiner* — Derrick V Rose
(74) *Attorney, Agent, or Firm* — Arent Fox LLP

(57) ABSTRACT

A transmission control device includes a memory; and a processor connected to the memory and configured to: specify layers corresponding to a number of hops of a link generated between a plurality of transmission points each of which wirelessly transmits a signal; and allocate radio resources which are used for transmission and reception of the signal and consecutive on a time axis to transmission points belonging to adjacent layers while sequentially switching the specified layers.

10 Claims, 11 Drawing Sheets

(56) References Cited

U.S. PATENT DOCUMENTS

2014/0341317 A1* 11/2014 Murakami .............. H04L 1/007
                                                                    375/296
2015/0016374 A1    1/2015  Liang et al.
2016/0150528 A1    5/2016  Barbieri et al.
2018/0219658 A1*   8/2018  Murakami ................ H04J 1/02

FOREIGN PATENT DOCUMENTS

JP      2015-510282 A      4/2015
WO   WO 2013/084991 A1    6/2013

* cited by examiner

| LAYER | NUMBER OF TPs |
|---|---|
| FIRST LAYER | 1 |
| SECOND LAYER | 2 |
| THIRD LAYER | 8 |
| FOURTH LAYER | 1 |
| FIFTH LAYER | 9 |
| SIXTH LAYER | 6 |
| SEVENTH LAYER | 5 |

TRANSMISSION CONTROL DEVICE, RADIO COMMUNICATION SYSTEM, AND RADIO RESOURCE ALLOCATION METHOD

CROSS-REFERENCE TO RELATED APPLICATION

This application is based upon and claims the benefit of priority of the prior Japanese Patent Application No. 2017-118101, filed on Jun. 15, 2017, the entire contents of which are incorporated herein by reference.

FIELD

The embodiments discussed herein are related to a transmission control device, a radio communication system, and a radio resource allocation method.

BACKGROUND

Generally, in a radio communication system employing time division duplex (TDD) in which transmission and reception is performed in a time division manner, signals of the same frequency band are transmitted and received in uplink (hereinafter referred to as "UL") and downlink (hereinafter referred to as "DL"). Therefore, due to the symmetry of radio channels, UL and DL radio channels can be regarded as being equivalent. Using this property, for example, a base station device carries out UL channel estimation using a UL reference signal transmitted from a user terminal, regards a UL channel estimation value as a DL channel estimation value, and performs precoding of a DL signal or the like.

Meanwhile, the UL and DL radio channels are symmetrical and equivalent, while transmission characteristics of transmission and reception circuit of devices such as the base station device and the user terminal are different. For this reason, for example, the UL channel estimation value that the base station device estimates from the UL reference signal does not accurately indicate an actual DL channel.

In other words, for example, a UL signal passes through a transmission circuit of the user terminal, passes through a UL radio channel, and passes through a reception circuit of the base station device. On the other hand, a DL signal passes through a transmission circuit of the base station device, passes through a DL radio channel, and passes through a reception circuit of the user terminal. For this reason, the UL channel for which the base station device performs channel estimation includes the transmission circuit of the user terminal and the reception circuit of the base station device, while an actual DL channel includes the transmission circuit of the base station device and the reception circuit of the user terminal. Since the transmission characteristics of the transmission circuit and the reception circuit are different between the base station device and the user terminal, the UL and DL channels differ from each other due to a difference in the transmission characteristics of the transmission and reception circuits.

In this regard, there are cases in which calibration is executed in order to obtain the accurate DL channel estimation value from the UL channel estimation value. The calibration is a process of calibrating the difference in the transmission characteristic of a plurality of transmission and reception circuits, and for example, a relative relation such as phase rotation and amplitude variation in a plurality of channels is obtained by performing transmission and reception of test signals. Specifically, for example, calibration of a device 1 including a transmission circuit T1 and a reception circuit R1 and a device k including a transmission circuit Tk and a reception circuit Rk as illustrated in FIG. 13 will be described.

As transmission and reception of the test signals are performed between two antennas illustrated in FIG. 13, a channel estimation value $h_{1,k}$ of a channel including the transmission circuit T1 indicated by a transfer function $T_1$, a radio channel, and the reception circuit Rk indicated by a transfer function $R_k$ and a channel estimation value $h_{k,1}$ of a channel including the transmission circuit Tk indicated by a transfer function $T_k$, a radio channel, and the reception circuit R1 indicated by a transfer function $R_1$ are obtained. A ratio of the channel estimation values $h_{1,k}$ and $h_{k,1}$ is indicated by the following Formula (1).

$$\frac{h_{1,k}}{h_{k,1}} \frac{R_k\, g_{1,k}\, T_1}{R_1\, g_{k,1}\, T_k} \frac{R_k/T_k}{R_1/T_1} \tag{1}$$

Here, in Formula (1), $g_{1,k}$ and $g_{k,1}$ are each a propagation path value of the radio channel and can be regarded as the same value in the transmission and reception in both directions. If a correction coefficient $u_1$ related to the transmission circuit T1 and the reception circuit R1 of the device 1 is defined as 1 from Formula (1), a correction coefficient $u_k$ for the transmission circuit Tk and the reception circuit Rk of the device k is given as in the following Formula (2).

$$u_k \frac{u_k}{u_1} \frac{R_k/T_k}{R_1/T_1} \frac{h_{1,k}}{h_{k,1}} \tag{2}$$

As the correction coefficient $u_k$ of the device k is obtained as described above, for example, if the channel estimation value $h_{k,1}$ of the signal transmitted from the device k to the device 1 is multiplied by the correction coefficient $u_k$, an accurate channel estimation value $h_{1,k}$ of a channel directed from the device 1 to the device k is obtained.

For example, the calibration is executed in coordinated multi-point transmission (CoMP) in which a plurality of transmission points (hereinafter referred to as "TPs") connected to one baseband processing device cooperate to transmit a signal to the user terminal. In a case in which signals are transmitted from a plurality of TPs, the calibration for calibrating the difference in the transmission characteristic of the transmission and reception circuits of each TP is executed. In other words, for example, the calibration of the two TPs is executed such that the test signals are transmitted and received between two TPs which are a calibration target, and the channel estimation value between the two TPs is obtained using the test signals. As described above, it is possible to implement TP calibration of the whole radio communication system by forming pairs from a plurality of TPs and sequentially calibrating each pair.

Patent Document 1: Japanese National Publication of International Patent Application No. 2013-542672
Patent Document 2: International Publication Pamphlet No. WO 2013/084991
Patent Document 3: Japanese National Publication of International Patent Application No. 2015-510282
Patent Document 4: Japanese Laid-open Patent Publication No. 2011-15318
Non-Patent Document 1: Daisuke Jitsukawa, Takashi Seyama, Takaharu Kobayashi, Teppei Oyama, Takashi Dateki, Hiroyuki Seki, Morihiko Minowa, "Study of Inter-Transmission Point Calibration Scheme for 5G Ultra High-Density Distributed Antenna Systems", IEICE-RCS2016-142, The Institute of Electronics, Information and Communication Engineers (IEICE), August 2016

However, there is a problem that the accuracy of calibration may decrease when the calibration is performed on a plurality of TPs. Specifically, for example, in a case in which the calibration is performed such that the two TPs serving as the calibration target transmit and receive the test signals as described above, transmission and reception timings of the test signals in the two TPs may coincide with each other. If the transmission and reception timings of the test signals in the two TPs coincide with each other, the test signal transmitted from one TP interferes with the test signal received from the other TP, the accuracy of the channel estimation between the two TPs decreases, and reliability of the calibration is lowered accordingly. Meanwhile, the transmission and reception timings of the test signals in the two TPs may be significantly apart from each other. In a case in which the transmission and reception timings of the test signals in the two TPs are significantly apart from each other, a temporal variation occurs in the radio channel between the two TPs, the accuracy of the channel estimation decreases, and the reliability of calibration decreases accordingly.

In order to suppress such a decrease in the accuracy of calibration, the transmission and reception of the test signals may be sequentially performed in a time division manner for each of pairs formed from all the TPs connected to the baseband processing device. However, in a case in which the transmission and reception of the test signal are sequentially performed in a time-division manner, it takes time to complete the transmission and reception of the test signals in all the pairs of TPs, and radio resources (particularly, time resources) are be wasted.

SUMMARY

According to an aspect of an embodiment, a transmission control device includes a memory; and a processor connected to the memory and configured to: specify layers corresponding to a number of hops of a link generated between a plurality of transmission points each of which wirelessly transmits a signal; and allocate radio resources which are used for transmission and reception of the signal and consecutive on a time axis to transmission points belonging to adjacent layers while sequentially switching the specified layers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
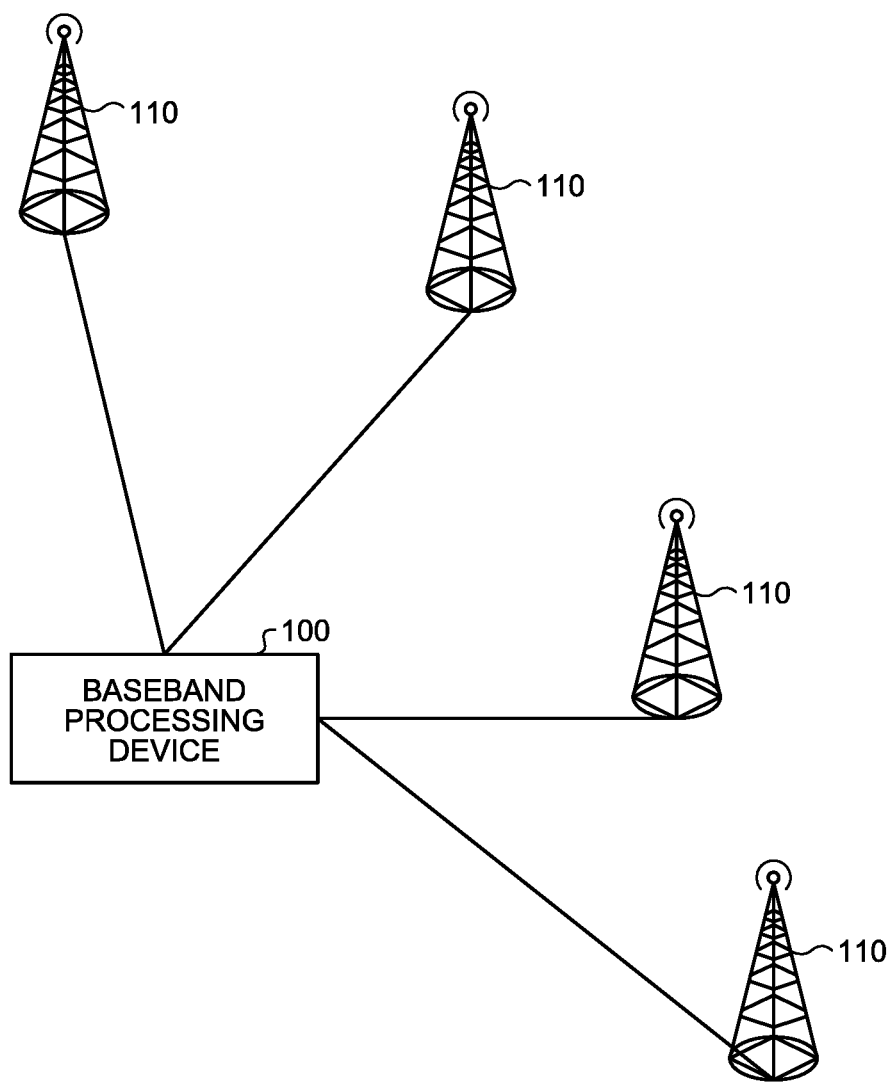
FIG. 1 is a diagram illustrating a configuration of a radio communication system according to a first embodiment.

Preferred embodiments of the present invention will be explained with reference to accompanying drawings. The disclosed technology is not limited by the following embodiments. Further, parts having equivalent functions in embodiments are denoted by the same reference numerals, and duplicate description will not be described.

[a] First Embodiment

FIG. 1 is a diagram illustrating a configuration of a radio communication system according to the first embodiment. As illustrated in FIG. 1, the radio communication system includes a baseband processing device 100 and a plurality of transmission points (TPs) 110, and each TP 110 is connected to the baseband processing device 100. Although not illustrated in FIG. 1, a plurality of other TPs may be connected to another baseband processing device and arranged.

When a signal is transmitted to a user terminal (not illustrated), the baseband processing device 100 causes a plurality of TPs 110 to cooperate to transmit a signal. In other words, the baseband processing device 100 generates a baseband signal addressed to the user terminal, performs precoding, and then transmits a baseband signal to a TP 110 of a transmission source. At this time, the baseband processing device 100 calculates a downlink (DL) channel estimation value from each TP 110 to the user terminal on the basis of an uplink (UL) channel estimation value from the user terminal to each TP 110, and generates a precoding matrix from the DL channel estimation value.

Further, the baseband processing device 100 performs calibration of a plurality of TPs 110 in order to execute cooperative transmission by the plurality of TPs 110. In other words, the baseband processing device 100 forms a pair from a plurality of TPs 110 connected to its own device, and generates a calibration link (hereinafter referred to as a "CAL link") between a pair of TPs 110 which is formed. Then, the baseband processing device 100 causes a calibration reference signal (hereinafter referred to as a "CAL signal") to be transmitted and received via the CAL link, and performs calibration between the TPs 110.

When the CAL link is generated, the baseband processing device 100 searches for the TP 110 that satisfies a condition with a TP 110 of a starting point which is a TP of a first layer, sets the corresponding TP 110 as a TP of a second layer, and generates a CAL link between the TP 110 of the starting point and the TP of the second layer. Then, the baseband processing device 100 searches for a TP 110 that satisfies a condition with each TP of the second layer, sets the corresponding TP 110 as a TP of a third layer, and generates a CAL link between the corresponding TP of the second layer and the TP of the third layer. Then, the baseband processing device 100 repeats the generation of the CAL link for each of the layers corresponding to the number of hops of the CAL link from the TP 110 of the starting point, and generates the CAL link between the TPs 110 connected to its own device.

Further, when the CAL signal is transmitted and received via the CAL link, the baseband processing device 100 allocates radio resources used for the transmission and reception of the CAL signal to the TPs 110 connected via the CAL link. In other words, the baseband processing device 100 allocates radio resources which are used for the transmission and reception of the CAL signal and consecutive on a time axis to TPs 110 belonging to adjacent layers while sequentially switching the layers corresponding to the number of hops of the CAL link. The allocation of the radio resources by the baseband processing device 100 will be described in detail later.

The TP 110 performs radio communicates with the user terminal (not illustrated). In other words, upon receiving the baseband signal addressed to the user terminal from the baseband processing device 100, the TP 110 performs a predetermined radio transmission process on the baseband signal and wirelessly transmits the resulting signal through an antenna. Further, the TP 110 receives a signal wirelessly transmitted from the user terminal through the antenna, and performs a predetermined radio reception process on the received signal. Then, the TP 110 transmits the baseband signal obtained by the radio reception process to the baseband processing device 100.

The TP 110 includes a transmission circuit and a reception circuit for each antenna. The transmission circuit executes the radio transmission process such as, for example, digital/analog (D/A) conversion and up-conversion, and the reception circuit executes the radio reception process such as, for example, down-conversion and analog/digital (A/D) conversion.

Since the transmission circuit and the reception circuit of each antenna have different transmission characteristics, the calibration is executed by the baseband processing device 100 as described above. At the time of calibration, the transmission circuit executes the radio transmission process on the CAL signal and transmits the CAL signal which has undergone the radio transmission process using the radio resources allocated by the baseband processing device 100. Further, the reception circuit receives the CAL signal using the radio resources allocated by the baseband processing device 100 and executes the radio reception process on the received CAL signal.

In a case in which the TP 110 includes a plurality of antennas, the calibration between reference antennas decided in advance in each TP 110 may be executed. In this case, if the calibration between the reference antenna and the other antenna is executed in each TP 110, the calibration between all the TPs 110 and all the antennas is executed.

Figure 2:
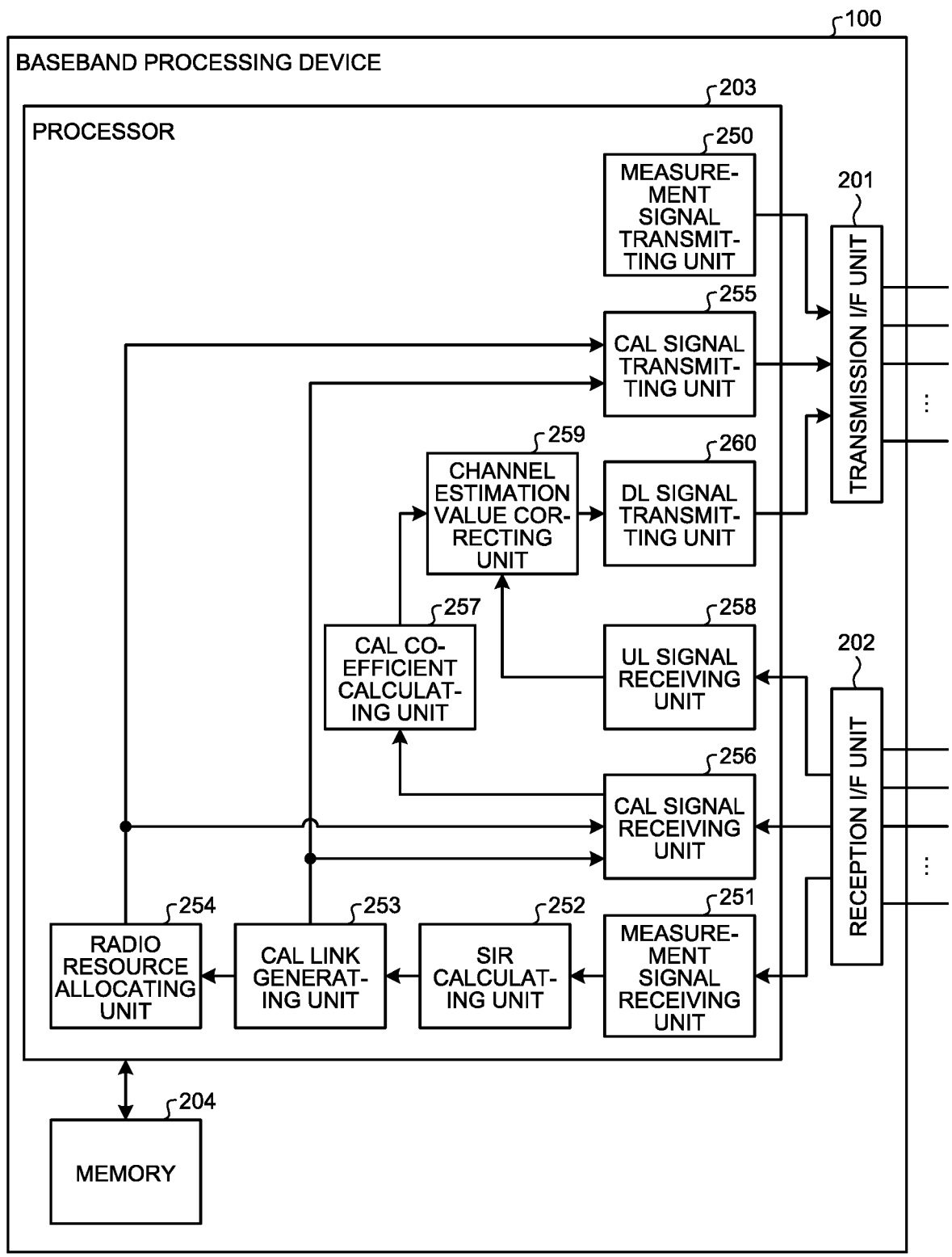
FIG. 2 is a block diagram illustrating a configuration of a baseband processing device according to the first embodiment.

FIG. 2 is a block diagram illustrating a configuration of the baseband processing device 100 according to the first embodiment. The baseband processing device 100 illustrated in FIG. 2 includes a transmission interface unit (hereinafter referred to as "transmission I/F unit") 201, a reception interface unit (hereinafter referred to as "reception I/F unit") 202, a processor 203, and a memory 204.

The transmission I/F unit 201 is connected to a plurality of TPs 110, and transmits a signal output from the processor 203 to each TP 110.

The reception I/F unit 202 is connected to a plurality of TPs 110, receives the signals transmitted from each TP 110, and outputs the signal to the processor 203.

The processor 203 includes, for example, a central processing unit (CPU), a field programmable gate array (FPGA), a digital signal processor (DSP), or the like, and executes various processes using the memory 204. Specifically, the processor 203 includes a measurement signal transmitting unit 250, a measurement signal receiving unit 251, an SIR calculating unit 252, a CAL link generating unit 253, a radio resource allocating unit 254, a CAL signal transmitting unit 255, a CAL signal receiving unit 256, and a CAL coefficient calculating unit 257. The processor 203 further includes a UL signal receiving unit 258, a channel estimation value correcting unit 259, and a DL signal transmitting unit 260.

The measurement signal transmitting unit 250 causes a known measurement signal for measuring an SIR between the TPs 110 to be transmitted in order from each TP 110. In other words, the measurement signal transmitting unit 250 causes the measurement signals to be transmitted from the TP 110 connected to the transmission I/F unit 201 in order one by one. The measurement signal transmitting unit 250 executes the transmission of the measurement signal from each TP 110 with a predetermined cycle such as, for example, once a day. Further, the measurement signal transmitting unit 250 may execute the transmission of the measurement signal from each TP 110 in a case in which an average reception level of the CAL signal received by the CAL signal receiving unit 256 to be described later is less than a predetermined threshold value. The measurement signal is used for the generation of the CAL link between the TPs 110.

The measurement signal receiving unit 251 receives the measurement signals which are sequentially transmitted from the TP 110 and received by another TP 110. In other words, since the TP 110 transmits the measurement signals in order one by one as described above, each TP 110 receives the measurement signal transmitted from the TP 110 other than itself. The transmission and reception of the measurement signal by the measurement signal transmitting unit 250 and the measurement signal receiving unit 251 may be executed using a guard period (GP) arranged at a boundary at which DL and UL are switched in TDD.

The SIR calculating unit 252 measures a radio quality between the TPs 110 using the measurement signal received by the measurement signal receiving unit 251. Specifically, the SIR calculating unit 252 calculates the SIRs of the measurement signals transmitted in both directions for each combination of the two TPs 110. Therefore, the SIR calculating unit 252 calculates the SIR in both directions for all pairs of the TPs 110.

The CAL link generating unit 253 generates the CAL link between the pair of TPs 110 on which the calibration is executed using the SIR calculated by the SIR calculating unit 252. In other words, the CAL link generating unit 253 decides the TPs 110 having the radio quality satisfying a predetermined criterion, and connects a pair of TPs 110 via the CAL link.

Specifically, the CAL link generating unit 253 decides one TP 110 as the starting point which is the TP of the first layer, and searches for the TP 110 in which the SIR between the starting point and the TP 110 is equal to or larger than a predetermined threshold value. Then, the CAL link generating unit 253 sets the corresponding TP 110 as the TP of the second layer, and generates a CAL link between the TP 110 of the starting point and the TP 110 of the second layer.

Further, the CAL link generating unit 253 sequentially selects the TPs 110 of the second layer one by one, and searches for the TP 110 in which the SIR with the selected TP 110 is equal to or larger than a predetermined threshold value. Then, the CAL link generating unit 253 sets the TP 110 not connected to the other TPs 110 among the corresponding TPs 110 as the TP of the third layer, and generates a CAL link between the selected TP 110 of the second layer and the TP 110 of the third layer.

Thereafter, the CAL link generating unit 253 repeats the above-described process, and if all the TPs 110 of the second layer are connected to the TP 110 of the third layer, the CAL link generating unit 253 sequentially selects the TP 110 of the third layer one by one and generates a CAL link with the TP 110 of the fourth layer. At this time, the CAL link generating unit 253 decides a pair of TPs 110 by excluding the TP 110 which satisfies the criteria since the SIR is equal to or larger than the predetermined threshold value but is already connected to another TP 110. Therefore, the CAL link generating unit 253 generates the CAL link in order from a higher layer close to the TP 110 of the starting point and does not change the CAL link which is generated once. Therefore, it is possible to suppress an increase in a processing amount for generating the CAL link.

Figure 3:
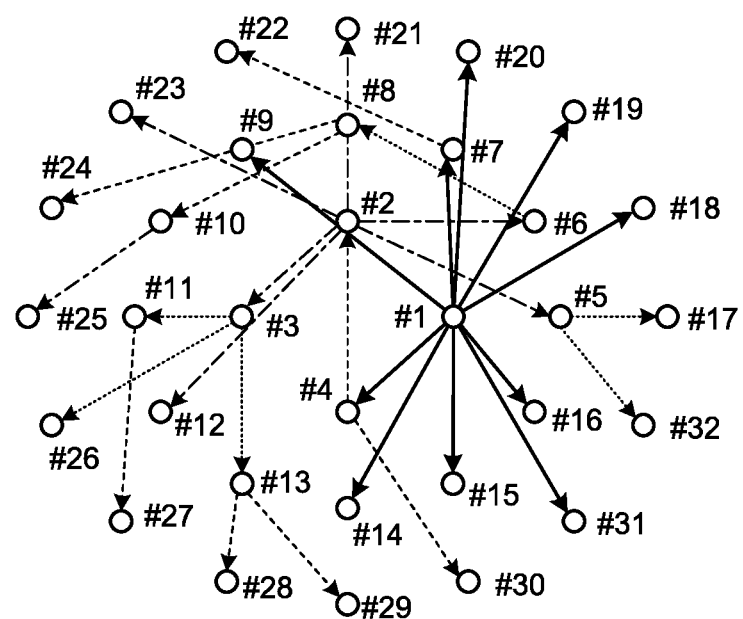
FIG. 3 is a diagram illustrating an example of a CAL link generated among a plurality of TPs.

FIG. 3 is a diagram illustrating an example of the CAL link generated among a plurality of TPs 110. In FIG. 3, white dots indicate positions of TPs, #m (m is an integer) indicates an identification number of a TP, and arrows indicate CAL links.

As illustrated in FIG. 3, if a TP #1 of the starting point which is the TP of the first layer is selected, the TP in which the SIR with the TP #1 of the starting point is equal to or larger than a predetermined threshold value is set as the TP of the second layer and connected with the TP #1 of the starting point via the CAL link. In FIG. 3, 10 TPs (a TP #4, a TP #7, a TP #9, a TP #14, a TP #15, a TP #16, a TP #18, a TP #19, a TP #20, and TP #31) are set as the TP of the second layer and connected with the TP #1 of the starting point via the CAL link.

Then, the TP of the second layer is sequentially selected, and the TP in which the SIR with the selected TP of the second layer is equal to or larger than a predetermined threshold value is set as the TP of the third layer and connected with the selected TP of the second layer via the CAL link. In FIG. 3, three TPs (a TP #2, a TP #30, and a TP #22) are set as the TP of the third layer and connected with the corresponding TP of the second layer via the CAL link.

Thereafter, the generation of the CAL link is repeated for each of the layers corresponding to the number of hops of the CAL link from the TP #1 of the starting point. Accordingly, in FIG. 3, one TP (a TP #25) is finally set as a TP of a seventh layer which is a terminal layer and connected with the corresponding TP of the sixth layer via the CAL link.

The description continues with reference back to FIG. 2. The radio resource allocating unit 254 allocates the radio resources used for the transmission and reception of the CAL signal to the TPs 110 connected via the CAL link generated via the CAL link generating unit 253.

Specifically, the radio resource allocating unit 254 specifies the layers corresponding to the number of hops of the CAL link and allocates radio resources which are used for the transmission and reception of the CAL signal and consecutive on the time axis to the TPs 110 belonging to adjacent layers while sequentially switching the specified layer. Here, the radio resources are time resources, for example, OFDM symbols.

Figure 4:
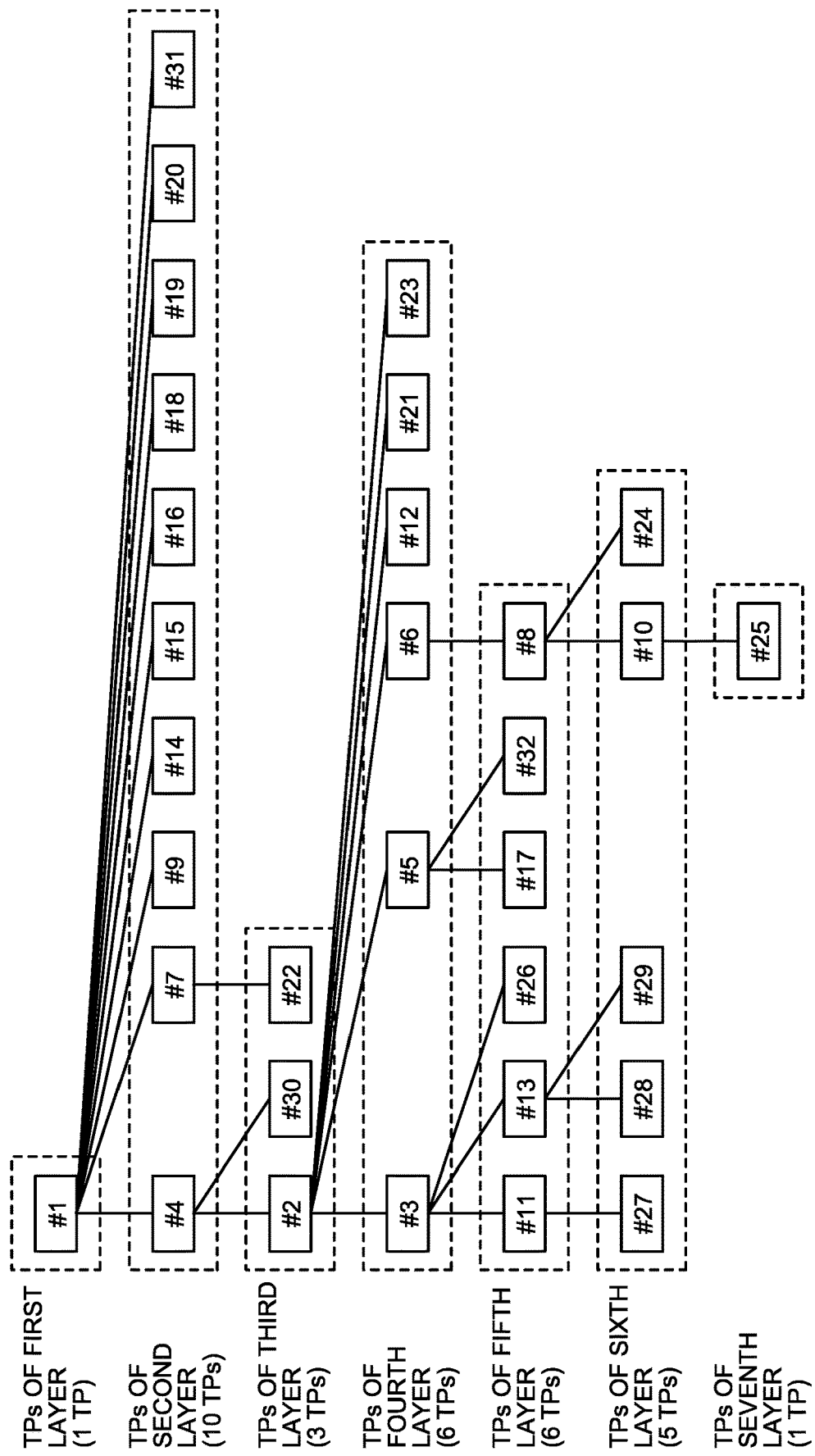
FIG. 4 is a diagram illustrating a specific example of specifying of a layer according to the first embodiment.

FIG. 4 is a diagram illustrating a specific example of the layer according to the first embodiment. A form in which the layers corresponding to the number of hops of the CAL link illustrated in FIG. 3 are specified is illustrated in FIG. 4. In other words, since the number of hops of the CAL link of the TP #1 of the starting point is 0, the first layer is specified as the layer to which the TP #1 of the starting point belongs. Further, the number of hops of the CAL link until it reaches from the TP #1 of the starting point to the TP #4, the TP #7, the TP #9, the TP #14, the TP #15, the TP #16, the TP #18, the TP #19, the TP #20, and the TP #31 is 1. For this reason, the second layer is specified as the layer to which the ten TPs (the TP #4, the TP #7, the TP #9, the TP #14, the TP #15, the TP #16, the TP #18, the TP #19, the TP #20, and the TP #31) belong. Further, the number of hops of the CAL link until it reaches from the TP #1 of the starting point to the TP #2, the TP #30, and the TP #22 is 2. Therefore, the third layer is specified as the layer to which the three TPs (the TP #2, the TP #30, and the TP #22) belong. Further, the number of hops of the CAL link until it reaches from the TP #1 of the starting point to the TP #3, the TP #5, the TP #6, the TP #12, the TP #21, and the TP #23 is 3. Therefore, the fourth layer is specified as the layer to which the six TPs (the TP #3, the TP #5, the TP #6, the TP #12, the TP #21, and the TP #23) belong. Further, the number of hops of the CAL link until it reaches from the TP #1 of the starting point to the TP #11, the TP #13, the TP #26, the TP #17, the TP #32, and the TP #8 is 4. Therefore, the fifth layer is specified as the layer to which the six TPs (the TP #11, the TP #13, the TP #26, the TP #17, the TP #32, and the TP #8) belong. Further, the number of hops of the CAL link until it reaches from the TP #1 of the starting point to the TP #27, the TP #28, the TP #29, the TP #10, and the TP #24 is 5. For this reason, the sixth layer is specified as the layer to which the five TPs (the TP #27, the TP #28, the TP #29, the TP #10, and the TP #24) belong. Further, since the number of hops of the CAL link until it reaches from the TP #1 of the starting point to the TP #25 is 6, the seventh layer is specified as the layer to which this one TP (TP #25) belongs.

Figure 5:
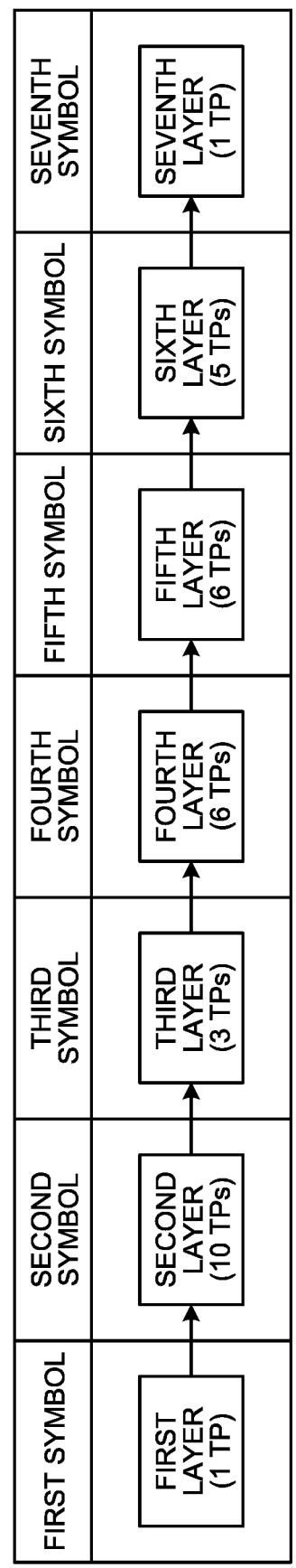
FIG. 5 is a diagram illustrating a specific example of allocation of radio resources according to the first embodiment.

FIG. 5 is a diagram illustrating a specific example of allocation of the radio resources according to the first embodiment. FIG. 5 illustrates an example in which the radio resource allocating unit 254 allocates the radio resources (OFDM symbols) to the TPs belonging to the layers illustrated in FIG. 4. As illustrated in FIG. 5, the radio resource allocating unit 254 alternately allocates a plurality of symbols corresponding to the number of specified layers to the TPs of the odd-numbered layers and the TPs of the even-numbered layers. In the example illustrated in FIG. 5, seven symbols (first to seventh symbols) corresponding to seven layers (the first to seventh layers) are alternately allocated to the TPs of the odd-numbered layers and the TPs of the even-numbered layers. In other words, the first symbol, a third symbol, a fifth symbol, and a seventh symbol are allocated to the TPs of the first layer, the third layer, the fifth layer, and the seventh layer, respectively. On the other hand, the second symbol, a fourth symbol, and a sixth symbol are allocated to the TPs of the second layer, the fourth layer, and the sixth layer, respectively. Accordingly, radio resources (symbols) which are used for the transmission and reception of the CAL signal and consecutive on the time axis are allocated to the TPs belonging to the adjacent layers. Therefore, a situation in which the transmission and reception timings of the CAL signal in the two TPs belonging to the adjacent layers coincide with each other or a situation in which the transmission and reception timings of the CAL signal in the two TPs are greatly apart from each other conversely are prevented. Accordingly, the interference of the CAL signal and the temporal variation of the radio channel between the two TPs which are factors of decreasing the accuracy of calibration are suppressed.

The description continues with reference back to FIG. 2. The CAL signal transmitting unit 255 causes the CAL signal to be transmitted from a plurality of TPs 110 via the CAL link generated via the CAL link generating unit 253. At this time, the CAL signal transmitting unit 255 causes the CAL signal to be transmitted from a plurality of TPs 110 using the radio resources allocated by the radio resource allocating unit 254. In a case in which a plurality of TPs 110 belong to the adjacent layers, the radio resources allocated to a plurality of TPs 110 by the radio resource allocating unit 254 are consecutive on the time axis. Therefore, a situation in which the transmission and reception timings of the CAL signal in a plurality of TPs 110 belonging to the adjacent layers coincide with each other or a situation in which the transmission and reception timings of the CAL signal in a plurality of TPs 110 are greatly apart from each other conversely are prevented. Accordingly, the interference of the CAL signal and the temporal variation of the radio channel among a plurality of TPs 110 which are factors of decreasing the accuracy of calibration are suppressed.

The CAL signal receiving unit 256 receives the CAL signal received by each TP 110 via the CAL link generated via the CAL link generating unit 253. At this time, the CAL signal receiving unit 256 receives the CAL signal received by each TP 110 using the radio resources allocated by the radio resource allocating unit 254.

The CAL coefficient calculating unit 257 executes the channel estimation using the CAL signal received by the CAL signal receiving unit 256 and calculates a calibration coefficient (hereinafter referred to as a "CAL coefficient") for calibrating the difference between the transmission characteristics of the transmission circuit and the reception circuit of each TP 110. Specifically, the CAL coefficient calculating unit 257 generates a calibration matrix C as follows.

In other words, a channel estimation value $h_{TP(m,n)}$ in a case in which the signal is transmitted from a TP #m (m is an integer) connected via the CAL link to a TP #n (n is an integer, n m) and a channel estimation value $h_{TP(n,m)}$ in a case in which the signal is transmitted in a reverse direction are indicated as follows.

$$h_{TP(m,n)} = R_n g_{TP(m,n)} T_m$$

$$h_{TP(n,m)} = R_m g_{TP(n,m)} T_n$$

However, $g_{TP(m,n)}$ and $g_{TP(n,m)}$ are propagation path values of the radio channel, respectively, and can be regarded as the same value in transmission and reception in both directions. Further, $T_m$ and $R_m$ are transfer functions of the transmission circuit and the reception circuit of the TP #m, and $T_n$ and $R_n$ are transfer functions of the transmission circuit and the reception circuit of the TP #n. The channel estimation values are obtained by performing the channel estimation on the CAL signal received by the CAL signal receiving unit 256. A calibration coefficient $c_{m,n}$ between the TP #m and the TP #n directly connected via the CAL link is assumed to be a ratio of the channel estimation value as follows.

$$c_{m,n} \frac{h_{TP(m,n)}}{h_{TP(n,m)}} \frac{R_n g_{TP(m,n)} T_m}{R_m g_{TP(n,m)} T_n} \frac{R_n}{T_n} \frac{T_m}{R_m}$$

Since each TP 110 is connected via the CAL link, arbitrary two TPs 110 can be connected by tracing one or more CAL links. In this regard, for example, in a case in which nine TPs 110 of the TP #0 to the TP #8 are connected to the baseband processing device 100, the calibration coefficients $c_0$ to $c_8$ of the TP #0 to the TP #8 based on the TP #0 are as follows.

$c_0 = 1$
$c_1 = c_{0,1}$
$c_2 = c_{0,2}$
$c_3 = c_{0,3}$
$c_4 = c_{0,1} c_{1,4}$
$c_5 = c_{0,1} c_{1,5}$
$c_6 = c_{0,2} c_{2,6}$
$c_7 = c_{0,2} c_{2,7}$
$c_8 = c_{0,8}$

In the calibration coefficients, for example, since the calibration coefficients $c_1$, $c_2$, $c_3$, and $c_8$ are equal to the calibration coefficients between the TPs 110 connected via the CAL link, it is understood that the TP #1, the TP #2, the TP #3, and the TP #8 are the TPs 110 directly connected to the TP #0. On the other hand, since the calibration coefficients $c_4$, $c_5$, $c_6$, and $c_7$ are indicated by a product of the calibration coefficients between the TPs 110 connected via the CAL link, it is understood that the TP #4, the TP #5, the TP #6, and the TP #7 are the TPs 110 connected to the TP #0 via another TP 110. Specifically, it is understood that the TPs #4 and the TP #5 are connected to the TP #0 via the TP #1, and the TP #6 and the TP #7 are connected to the TP #0 via the TP #2. In this case, the CAL coefficient calculating unit 257 obtains a diagonal matrix having the calibration coefficients $c_0$ to $c_8$ as diagonal elements as the calibration matrix C. In other words, the CAL coefficient calculating unit 257 generates the calibration matrix C indicated in the following Formula (3).

$$C \text{ diag}(c_0, c_1, , c_8) \quad (3)$$
$$\text{diag } 1, \frac{R_1}{T_1} \frac{T_0}{R_0}, , \frac{R_8}{T_8} \frac{T_0}{R_0}$$
$$\frac{T_0}{R_0} \text{ diag } \frac{R_0}{T_0}, \frac{R_1}{T_1}, , \frac{R_8}{T_8}$$

Here, diag( ) in Formula (3) indicates the diagonal matrix. The calibration matrix C indicates the ratio of the transfer function of the transmission circuit and the reception circuit of each of the TP #0 to the TP #8 based on the transfer function of the transmission circuit and the reception circuit of the TP #0. Therefore, it is possible to obtain a DL channel matrix by multiplying an inverse matrix $C^{-1}$ of the calibration matrix C by a UL channel matrix.

The UL signal receiving unit 258 receives the UL signal which is transmitted from the user terminal and received by each TP 110. Then, the UL signal receiving unit 258 calculates the channel estimation value between the user terminal and each TP 110 using the UL signal. At this time, the UL signal receiving unit 258 generates a UL channel matrix having, as elements, the channel estimation values of combinations of a plurality of user terminals and a plurality of TPs 110.

The channel estimation value correcting unit 259 corrects the channel estimation value calculated by the UL signal receiving unit 258 using the CAL coefficient calculated by the CAL coefficient calculating unit 257. In other words, the channel estimation value correcting unit 259 obtains the DL channel estimation value by correcting the UL channel estimation value calculated by the UL signal receiving unit 258 using the CAL coefficient. Specifically, the channel estimation value correcting unit 259 multiplies the UL channel matrix generated by the UL signal receiving unit 258 by the inverse matrix $C^{-1}$ of the calibration matrix C generated by the CAL coefficient calculating unit 257. Accordingly, the channel estimation value correcting unit 259 obtains the DL channel matrix from the UL channel matrix.

The DL signal transmitting unit 260 transmits the DL signal having the user terminal as the destination using the DL channel estimation value obtained by the channel estimation value correcting unit 259. Specifically, the DL signal transmitting unit 260 generates a precoding matrix of the DL signal using the DL channel estimation value, precodes the DL signal, and transmits the resulting DL signal to each TP 110. Accordingly, the DL signal is transmitted from each TP 110 with an appropriate transmission weight, and interference in the user terminal can be reduced.

Figure 6:
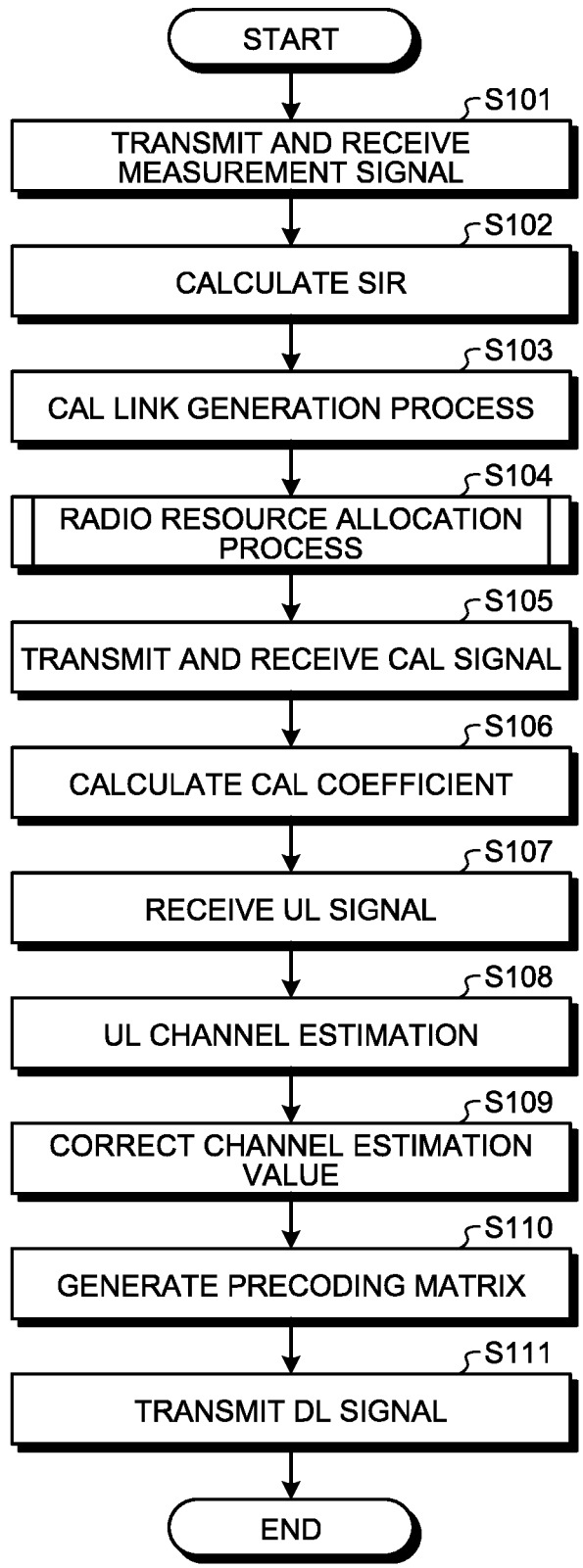
FIG. 6 is a flowchart illustrating a DL transmission method according to the first embodiment.

Next, a method of transmitting the DL signal by the baseband processing device 100 configured as described above will be described with reference to a flow chart illustrated in FIG. 6. FIG. 6 is a flowchart illustrating a DL transmission method according to the first embodiment.

For example, in a case in which a predetermined cycle such as once a day arrives or in a case in which an average reception level of the CAL signal becomes less than a predetermined threshold value, a known measurement signal is transmitted and received between TPs 110 in order to generate the CAL link (Step S101). Specifically, the measurement signal transmitting unit 250 sequentially instructs the transmission of the measurement signal from one TP 110, and the measurement signals received by the other TPs 110 are received by the measurement signal receiving unit 251. The transmission and reception of the measurement signal may be executed by using, for example, a GP in which none of DL and UL signals is transmitted and received.

Then, the SIR between the TPs 110 is calculated by using the measurement signal received by the measurement signal receiving unit 251 (Step S102). In other words, since the measurement signal is transmitted and received between each of all the pairs of TPs 110, the SIR calculating unit 252 calculates the SIR between the TPs 110 of each pair. If the SIR is calculated for all the pairs, the CAL link used for the transmission and reception of the CAL signal is generated by the CAL link generating unit 253 (Step S103).

At the time of CAL link generation, the TP 110 of one starting point is selected, and the TP 110 in which the SIR from the TP 110 of the starting point satisfies a predetermined criterion is sequentially connected. At this time, the CAL link is generated in order from the TP 110 which is small in the number of hops from the TP 110 of the starting point. In other words, the CAL link is generated in order from the TP 110 of the higher layer, and the CAL link generated once is not changed when the CAL link is generated for the TP 110 of the lower layer.

If the CAL link is generated, the radio resource allocating unit 254 allocates radio resources used for the transmission and reception of the CAL signal to the TPs 110 connected via the CAL link (Step S104).

At the time of radio resource allocation, the layers corresponding to the number of hops of the CAL link are specified, the specified layer is sequentially switched, and radio resources (symbols) which are consecutive on the time axis are allocated to the TPs 110 belonging to the adjacent layers. The radio resource allocation process will be described in detail later.

If the CAL link is generated, and the radio resources are allocated, the CAL signal is transmitted and received between the TPs 110 connected via the CAL link (Step S105). Specifically, the CAL signal transmitting unit 255 sequentially instructs the transmission of the CAL signal from one of the TPs 110, and the CAL signals received by the other TPs 110 are received by the CAL signal receiving unit 256. At this time, the CAL signal transmitting unit 255 gives an instruction to transmit the CAL signal from a plurality of TPs 110 belonging to the adjacent layers using the radio resources allocated by the radio resource allocating unit 254.

If the CAL signal is transmitted and received, the channel estimation using the CAL signal is executed by the CAL coefficient calculating unit 257, and the CAL coefficient for calibrating the difference in the transmission characteristics of the transmission circuit and the reception circuit of each TP 110 is calculated on the basis of the channel estimation value between the TPs 110 (Step S106). Specifically, the CAL coefficient calculating unit 257 calculates the calibration matrix C and the inverse matrix $C^{-1}$ indicated by, for example, Formula (3). The calibration matrix C is a matrix having the ratio of the transmission characteristic of the transmission circuit and the reception circuit of each TP 110 as the diagonal element, and the DL channel matrix is obtained by multiplying the UL channel matrix by the inverse matrix $C^{-1}$.

It is possible to correct the UL channel matrix to the DL channel matrix by executing the calibration through the transmission and reception of the CAL signal between the TPs 110 connected via the CAL link as described above. In this regard, if the UL signal is transmitted from the user terminal, the UL signal is received by the TP 110 of the communication partner of the user terminal and transmitted to the baseband processing device 100. Then, the UL signal is received by the UL signal receiving unit 258 (Step S107), and the UL channel estimation is executed (Step S108). In other words, the UL channel matrix between the user terminal and the TP 110 is obtained by the UL signal receiving unit 258.

The obtained UL channel matrix is output to the channel estimation value correcting unit 259, and the channel estimation value correcting unit 259 corrects the channel estimation value (Step S109). Specifically, the DL channel matrix is obtained by multiplying the UL channel matrix by the inverse matrix $C^{-1}$ of the calibration matrix C.

Then, the DL channel matrix is output to the DL signal transmitting unit 260, and the DL signal transmitting unit 260 generates a precoding matrix for applying a transmission weight to the DL signal (Step S110). At this time, the DL signal transmitting unit 260 generates the precoding matrix by using the channel estimation value corrected by the channel estimation value correcting unit 259. In other words, the precoding matrix is generated on the basis of the DL channel matrix obtained by correcting the UL channel matrix.

Then, the signal of the DL addressed to the user terminal is precoded using the precoding matrix and transmitted from the transmission I/F unit 201 to each TP 110 (Step S111). The DL signal is wirelessly transmitted from each TP 110 to the user terminal. Since the precoding matrix is obtained from the DL channel matrix obtained by correcting the UL channel matrix, and the DL signal is precoded, a reception characteristic of the DL signal in the user terminal can be improved.

Next, the radio resource allocation process in Step S104 will be described. The radio resource allocation process in Step S104 is mainly executed by the radio resource allocating unit 254.

First, the layers corresponding to the number of hops of the CAL link are specified. If the layers are specified, a plurality of radio resources (symbols) corresponding to the number of specified layers are prepared. If a plurality of symbols corresponding to the number of layers corresponding to the number of hops of the CAL link are prepared, a plurality of symbols are alternately allocated to the TPs 110 of the odd-numbered layers and the TPs 110 of the even-numbered layers. Accordingly, radio resources (symbols) which are used for the transmission and reception of the CAL signal and consecutive on the time axis are allocated to the TPs belonging to the adjacent layers. Thus, a situation in which the transmission and reception timings of the CAL signal in the two TPs belonging to the adjacent layers coincide with each other and a situation in which the transmission and reception timings of the CAL signal in the two TPs are greatly apart from each other conversely are prevented. Accordingly, the interference of the CAL signal and the temporal variation of the radio channel between the two TPs which are factors of decreasing the accuracy of calibration are suppressed. Accordingly, in the calibration based on the channel estimation result using the CAL signal which is transmitted and received between the two TPs, the degradation of the channel estimation accuracy caused by the interference of the CAL signal or the temporal variation of the radio channel is suppressed, and the calibration with the high degree of accuracy can be performed.

As described above, according to the present embodiment, radio resources which are used for the transmission and reception of the CAL signal and consecutive on a time axis are allocated to the TPs belonging to the adjacent layers while sequentially switching the layers corresponding to the number of hops of the CAL link generated among a plurality of TPs. If the radio resources are allocated to all the TPs, the calibration is executed by transmitting and receiving the CAL signal using the allocated radio resources. Thus, a situation in which the transmission and reception timings of the CAL signal in the two TPs belonging to the adjacent layers coincide with each other and a situation in which the transmission and reception timings of the CAL signal in the two TPs are greatly apart from each other conversely are prevented. Accordingly, the interference of the CAL signal and the temporal variation of the radio channel between the two TPs which are factors of decreasing the accuracy of calibration are suppressed. Accordingly, in the calibration based on the channel estimation result using the CAL signal which is transmitted and received between the two TPs, the degradation of the channel estimation accuracy caused by the interference of the CAL signal or the temporal variation of the radio channel is suppressed, and the calibration with the high degree of accuracy can be performed. Further, when the CAL signal is transmitted and received, it is possible to omit the process of sequentially performing the transmission and reception of the CAL signal in a time division manner for each of the pairs formed from a plurality of TPs, and the waste of the radio resources is suppressed. In other words, according to the present embodiment, it is possible to perform the calibration between TPs with a high degree of accuracy while suppressing the waste of the radio resources.

[b] Second Embodiment

In a second embodiment, one radio resource is allocated to the transmission points belonging to the odd-numbered layers, and one radio resource is allocated to the transmission points belonging to the even-numbered layers. A basic configuration of a baseband processing device of the second embodiment is similar to that of the baseband processing device 100 of the first embodiment and will be described with reference to FIG. 2.

In the baseband processing device 100 of the second embodiment, the radio resource allocating unit 254 specifies the layers corresponding to the number of hops of the CAL link and then performs the following process. In other words, the radio resource allocating unit 254 allocates one radio resource out of two radio resources which are consecutive on the time axis to the TPs 110 belonging to the odd-numbered layers. On the other hand, the radio resource allocating unit 254 allocates the other radio resource out of the two radio resources which are consecutive on the time axis to the TPs 110 belonging to the even-numbered layers.

Figure 7:
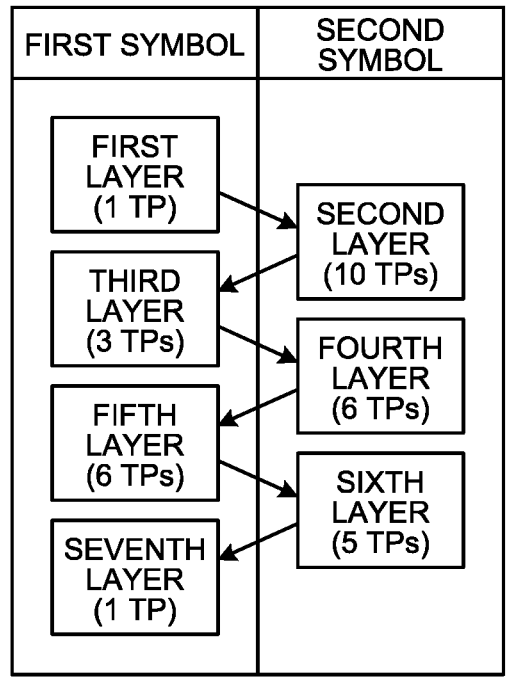
FIG. 7 is a diagram illustrating a specific example of allocation of radio resources according to a second embodiment.

FIG. 7 is a diagram illustrating a specific example of allocation of radio resources according to the second embodiment. FIG. 7 illustrates an example in which the radio resource allocating unit 254 allocates the radio resources (OFDM symbols) to the TPs belonging to the layers illustrated in FIG. 4. As illustrated in FIG. 7, the radio resource allocating unit 254 allocates one of two symbols which are consecutive on the time axis to the TPs 110 belonging to the odd-numbered layers. On the other hand, the radio resource allocating unit 254 allocates the other symbol of the two symbols which are consecutive on the time axis to the TPs 110 belonging to the even-numbered layers. In the example illustrated in FIG. 7, a first symbol is allocated to the TPs of the first layer, the third layer, the fifth layer, and the seventh layer which are the odd-numbered layers, and a second symbol consecutive to the first symbol on the time axis is allocated to the TPs of the second layer, the fourth layer, and the sixth which are the even-numbered layers. Accordingly, the radio resources (symbols) which are used for the transmission and reception of the CAL signal and consecutive on the time axis are allocated to the TPs belonging to the adjacent layers.

As described above, according to the present embodiment, one of two radio resources which are consecutive on the time axis is allocated to the TPs belonging to the odd-numbered layers, and the other radio resource is allocated to the TPs belonging to the even-numbered layers. Accordingly, the radio resources used for the transmission and reception of the CAL signal can be reduced, and the waste of the radio resources can be further suppressed accordingly.

[c] Third Embodiment

In the second embodiment, the radio resources are unconditionally allocated to TPs belonging to a certain layer. On the other hand, in a third embodiment, only in a case in which a total of the number of TPs to which one radio resource is allocated from a higher layer to a certain layer is an upper limit value or less, the radio resources are allocated to the TP belonging to the corresponding layer. A basic configuration of a baseband processing device of the third embodiment is similar to that of the baseband processing device 100 of the first embodiment and will be described with reference to FIG. 2.

In the baseband processing device 100 of the third embodiment, the radio resource allocating unit 254 specifies the layers corresponding to the number of hops of the CAL link and then performs the following process. In other words, the radio resource allocating unit 254 switches the specified layer, and one radio resource is assumed to be allocated to the TP 110 belonging to the layer after one radio resource is switched each time the layer is switched. Then, the radio resource allocating unit 254 determines whether or not a total of the number of TPs 110 to which one radio resource is allocated from the higher layer to the layer after the switching is an upper limit value or less. Here, the upper limit value is, for example, a value indicating the number of resources other than those in the time domain which can be multiplexed in the same radio resources (symbol). The resources other than those in the time domain which can be multiplexed in the same radio resources (symbol) are, for example, frequency resources or code resources.

Then, in a case in which a total of the number of TPs 110 to which one radio resource is allocated is the upper limit value or less, the radio resource allocating unit 254 allocates one radio resource to the TPs 110 belonging to the layer after the switching. On the other hand, in a case in which a total of the number of the TPs 110 exceeds the upper limit value, the radio resource allocating unit 254 allocates unallocated radio resources which are consecutive to the radio resources allocated to the TP 110 of the higher layer adjacent to the layer after the switching on the time axis to the TPs 110 belonging to the layer after the switching.

Figure 8:
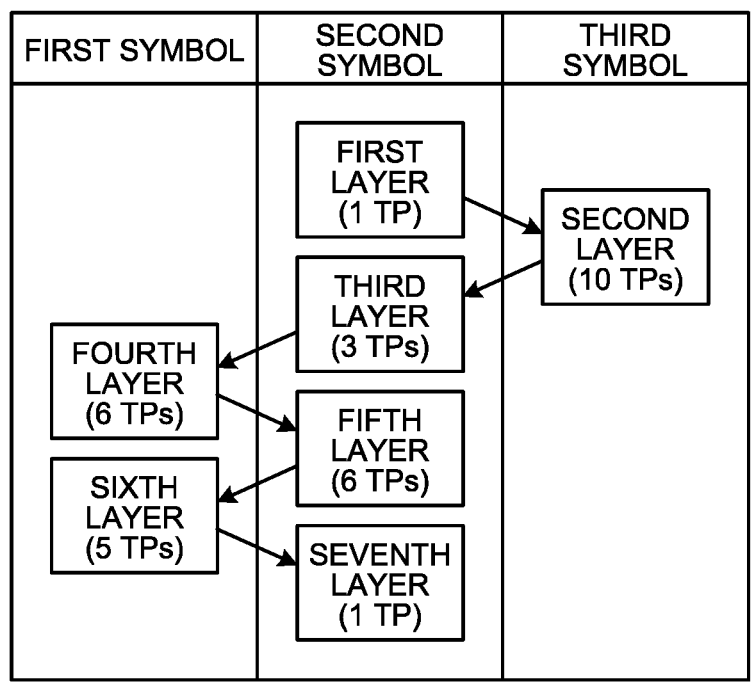
FIG. 8 is a diagram illustrating a specific example of allocation of radio resources according to a third embodiment.

FIG. 8 is a diagram illustrating a specific example of allocation of the radio resources according to the third embodiment. FIG. 8 illustrates an example in which the radio resource allocating unit 254 allocates the radio resources (OFDM symbols) to the TPs belonging to the layers illustrated in FIG. 4. In FIG. 8, a value indicating the number of resources other than those in the time domain which can be multiplexed in the same symbol is assumed to be 15. In other words, the upper limit value of a total of the number of TPs to which one symbol is allocated is assumed to be 15. As illustrated in FIG. 8, the radio resource allocating unit 254 switches the layer in order from the first layer, and one radio resource is assumed to be allocated to the TP 110 belonging to the layer after the switching each time the layer is switched. Then, the radio resource allocating unit 254 determines whether or not a total of the number of TPs 110 to which one radio resource is allocated from the higher layer to the layer after the switching is 15 or less which is the upper limit value. Then, in a case in which a total of the number of TPs 110 is 15 or less, the radio resource allocating unit 254 allocates one radio resource to the TP 110 belonging to the layer after the switching. In the example illustrated in FIG. 8, since a total of the number of the TPs 110 to which the second symbol is allocated from the first layer of the higher layer to the third layer is 4 which is lower than the upper limit value (that is, 15), the second symbol is allocated to the TPs 110 of the first layer and the third layer. Further, since a total of the number of TPs 110 to which the third symbol is allocated up to the second layer is 10 which is lower the upper limit value (that is, 15), the third symbol is allocated to the TP 110 of the second layer.

On the other hand, in a case in which a total of the number of the TPs 110 exceeds the upper limit value, the radio resource allocating unit 254 allocates unallocated radio resources which are consecutive to the radio resources allocated to the TP 110 of the higher layer adjacent to the layer after the switching on the time axis to the TPs 110 belonging to the layer after the switching. In the example illustrated in FIG. 8, if the third symbol is assumed to be allocated to the fourth layer, a total of the number of TPs 110 to which the third symbol is allocated from the second layer of the higher layer to the fourth layer is 16 which exceeds the upper limit value (that is, 15). For this reason, in the example illustrated in FIG. 8, the unallocated first symbol which is consecutive to the second symbol allocated to the TP 110 of the third layer of the higher layer adjacent to the fourth layer on the time axis is allocated to the TP 110 of the fourth layer. Accordingly, the radio resources (symbols) which are used for the transmission and reception of the CAL signal and consecutive on the time axis are allocated to the TPs belonging to the adjacent layers.

As described above, according to the present embodiment, only in a case in which a total of the number of TPs to which one radio resource is allocated from a higher layer to a certain layer is the upper limit value or less, the radio resources are allocated to the TP belonging to the corresponding layer. Here, the upper limit value is a value indicating the number of resources other than time domain that can be multiplexed to the same radio resources (symbol), for example. Accordingly, a total of the number of TPs to which the same radio resources are allocated does not exceed the number of resources other than those in the time domain which can be multiplexed in the same radio resources (symbol). Therefore, it is possible to prevent interference between resources other than those in the time domain in the same radio resources, that is, frequency resources or code resources.

[d] Fourth Embodiment

In the third embodiment, unallocated radio resources are allocated to the TPs belonging to the corresponding layer in a case in which a total of the number of TPs to which one radio resource is allocated from a higher layer to a certain layer exceeds the upper limit value. On the other hand, in a fourth embodiment, in a case in which a total of the number of TPs to which one radio resource is allocated from a higher layer to a certain layer exceeds the upper limit value, unallocated radio resources are added to the TP of the higher layer adjacent to the corresponding layer. A basic configuration of a baseband processing device of the fourth embodiment is similar to as that of the baseband processing device 100 of the first embodiment and will be described with reference to FIG. 2.

In the baseband processing device 100 of the fourth embodiment, the radio resource allocating unit 254 specifies the layers corresponding to the number of hops of the CAL link and then performs the following process. In other words, the radio resource allocating unit 254 switches the specified layer, and one radio resource is assumed to be allocated to the TP 110 belonging to the layer after the switching each time the layer is switched. Then, the radio resource allocating unit 254 determines whether or not a total of the number of TPs 110 to which one radio resource is allocated from the higher layer to the layer after the switching is an upper limit value or less. Here, the upper limit value is, for example, a value indicating the number of resources other than those in the time domain which can be multiplexed in the same radio resources (symbol). The resources other than those in the time domain which can be multiplexed in the same radio resources (symbol) are, for example, frequency resources or code resources.

Then, in a case in which a total of the number of TPs 110 to which one radio resource is allocated is the upper limit value or less, the radio resource allocating unit 254 allocates one radio resource to the TP 110 belonging to the layer after the switching. On the other hand, in a case in which a total of the number of the TPs 110 exceeds the upper limit value, the radio resource allocating unit 254 allocates unallocated radio resources to the TP 110 of the higher layer adjacent to the layer after the switching, in addition to the allocated radio resources.

Figures 9, 10:
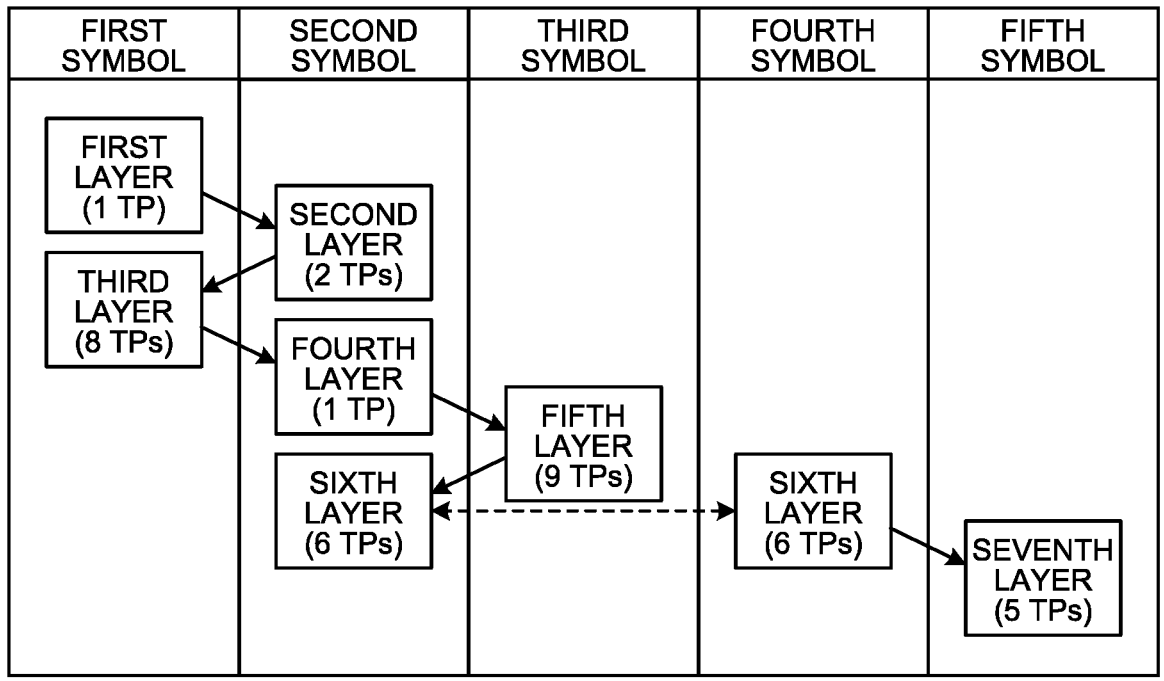
FIG. 9 is a diagram illustrating a specific example of allocation of radio resources according to a fourth embodiment.
FIG. 10 is a diagram illustrating an example of a relation between layers corresponding to the number of hops of a CAL link and the number of TPs belonging to each layer.

FIG. 9 is a diagram illustrating a specific example of allocation of the radio resources in accordance with the fourth embodiment. FIG. 10 is a diagram illustrating an example of a relation between the layers corresponding to the number of hops of the CAL link and the number of TPs belonging to each layer. FIG. 9 illustrates an example in which the radio resource allocating unit 254 allocates the radio resources (OFDM symbols) to the TPs belonging to the layers illustrated in FIG. 10. Further, in FIG. 9, the value indicating the number of resources other than those in the time domain which can be multiplexed in the same symbol is assumed to be 10. In other words, the upper limit value of a total of the number of TPs to which one symbol is allocated is assumed to be 10.

As illustrated in FIG. 9, the radio resource allocating unit 254 switches the layer in order from the first layer, and one radio resource is assumed to be allocated to the TP 110 belonging to the layer after the switching each time the layer is switched. Then, the radio resource allocating unit 254 determines whether or not a total of the number of the TPs 110 to which one radio resource is allocated from the higher layer to the layer after the switching is the upper limit value (that is, 10) or less. Then, in a case in which a total of the number of the TPs 110 is the upper limit value (that is, 10) or less, the radio resource allocating unit 254 allocates one radio resource to the TPs 110 belonging to the layer after the switching. In the example illustrated in FIG. 9, since a total of the number of the TPs 110 to which the first symbol is allocated from the first layer of the higher layer to the third layer is 9 which is lower than the upper limit value (that is, 10), the first symbol is allocated to the TPs 110 of the first layer and the third layer. Further, since a total of the number of TPs 110 to which the second symbol is allocated from the second layer of the higher layer to the fourth layer is 3 which is lower than the upper limit value (that is, 10), the second symbol is allocated to the TPs 110 of the second layer and the fourth layer.

On the other hand, in a case in which a total of the number of the TPs 110 exceeds the upper limit value, the radio resource allocating unit 254 allocates unallocated radio resources which are consecutive to the radio resources allocated to the TP 110 of the higher layer adjacent to the layer after the switching on the time axis to the TPs 110 belonging to the layer after the switching. In the example illustrated in FIG. 9, if the first symbol is assumed to be allocated to the fifth layer, a total of the number of TPs 110 to which the first symbol is allocated from the first layer of the higher layer to the fifth layer is 18 which exceeds the upper limit value (that is, 10). For this reason, in the example illustrated in FIG. 9, the unallocated third symbol which is consecutive to the second symbol allocated to the TP 110 of the fourth layer of the higher layer adjacent to the fifth layer on the time axis is allocated to the TP 110 of the fifth layer.

Further, in the example illustrated in FIG. 9, since a total of the number of the TPs 110 to which the second symbol is allocated from the second layer of the higher layer to the sixth layer is 9 which is lower than the upper limit value (that is, 10), the second symbol is allocated to the TP 110 of the sixth layer. Then, if the second symbol is allocated to the TP 110 of the sixth layer, the layer is switched from the sixth layer to the seventh layer, and the first symbol or the third symbol which is consecutive to the second symbol is assumed to be allocated to the TP 110 of the seventh layer. Thus, a total of the number of TPs 110 to which the first symbol is allocated from the first layer of the higher layer to the seventh layer is 14 which exceeds the upper limit value (that is, 10). Further, a total of the number of TPs 110 to which the third symbol is allocated from the fifth layer of the higher layer to the seventh layer is 14 which exceeds the upper limit value (that is, 10).

In this regard, the radio resource allocating unit 254 allocates unallocated radio resources to the TP 110 of the higher layer adjacent to the layer after the switching, in addition to the allocated radio resources. In the example illustrated in FIG. 9, the unallocated fourth symbol is allocated to the TP 110 of the sixth layer of the higher layer adjacent to the seventh layer after the switching as a second symbol in addition to the allocated second symbol. Accordingly, radio resources (symbols) which are used for the transmission and reception of the CAL signal and consecutive on the time axis are allocated to the TPs belonging to the adjacent layers.

As described above, according to the present embodiment, in a case in which a total of the number of TPs to which one radio resource is allocated from a higher layer to a certain layer exceeds the upper limit value, unallocated radio resources are added to the TP of the higher layer adjacent to the corresponding layer. Accordingly, even in a case in which a total of the number of TPs to which the same radio resources are allocated exceeds the number of resources other than those in the time domain which can be multiplexed in the same radio resources (symbol), other unallocated radio resources are added to the TP of the higher layer. Therefore, it is possible to more stably prevent interference between resources other than those in the time domain in the same radio resources, that is, frequency resources or code resources.

[e] Fifth Embodiment

In the fourth embodiment, in a case in which a total of the number of TPs to which one radio resource is allocated from a higher layer to a certain layer exceeds the upper limit value, unallocated radio resources are added to the TPs of the higher layers adjacent to the corresponding layer. However, if two radio resources are allocated to one TP, the number of radio resources used for the transmission and reception of the CAL signal increases. In this regard, in a fifth embodiment, in order to reduce opportunities for allocating two radio resources to one TP, the conditions for allocating radio resources are strictly set. A basic configuration of a baseband processing device of the fifth embodiment is similar to that of the baseband processing device 100 of the first embodiment and will be described with reference to FIG. 2.

In the baseband processing device 100 of the fifth embodiment, the radio resource allocating unit 254 specifies the layers corresponding to the number of hops of the CAL link and then performs the following process. In other words, the radio resource allocating unit 254 switches the specified layer, and one radio resource is assumed to be allocated to the TP 110 belonging to the layer after the switching each time the layer is switched. Then, the radio resource allocating unit 254 determines whether or not a total of the number of TPs 110 to which one radio resource is allocated from the higher layer to the layer after the switching is an upper limit value or less. Here, the upper limit value is, for example, a value indicating the number of resources other than those in the time domain which can be multiplexed in the same radio resources (symbol). The resources other than those in the time domain which can be multiplexed in the same radio resources (symbol) are, for example, frequency resources or code resources.

In a case in which a total of the number of TPs 110 to which one radio resource is allocated is the upper limit value or less, the radio resource allocating unit 254 further performs the following determination process with respect to the lower layer adjacent to the layer after the switching. In other words, the radio resource allocating unit 254 is assumed to allocate other radio resources which are consecutive to the one radio resource on the time axis in a forward direction or a reverse direction to the TP 110 of the lower layer adjacent to the layer after the switching. Then, the radio resource allocating unit 254 determines whether or not a total of the number of the TPs 110 to which other radio resources are allocated from the higher layer to the lower layer adjacent to the layer after the switching is the upper limit value or less.

Then, in a case in which a total of the number of TPs 110 to which other radio resources are allocated is the upper limit value or less, the radio resource allocating unit 254 allocates the one radio resource to the TP 110 belonging to the layer after the switching.

On the other hand, the radio resource allocating unit 254 performs the following process without allocating the one radio resource in a case in which a total of the number of the TPs 110 to which other radio resources are allocated exceeds the upper limit value. In other words, the radio resource allocating unit 254 allocates unallocated radio resources which are consecutive the radio resources allocated to the TP 110 belonging to the higher layer adjacent to the layer after the switching on the time axis to the TP 110 belonging to the layer after the switching.

Figure 11:
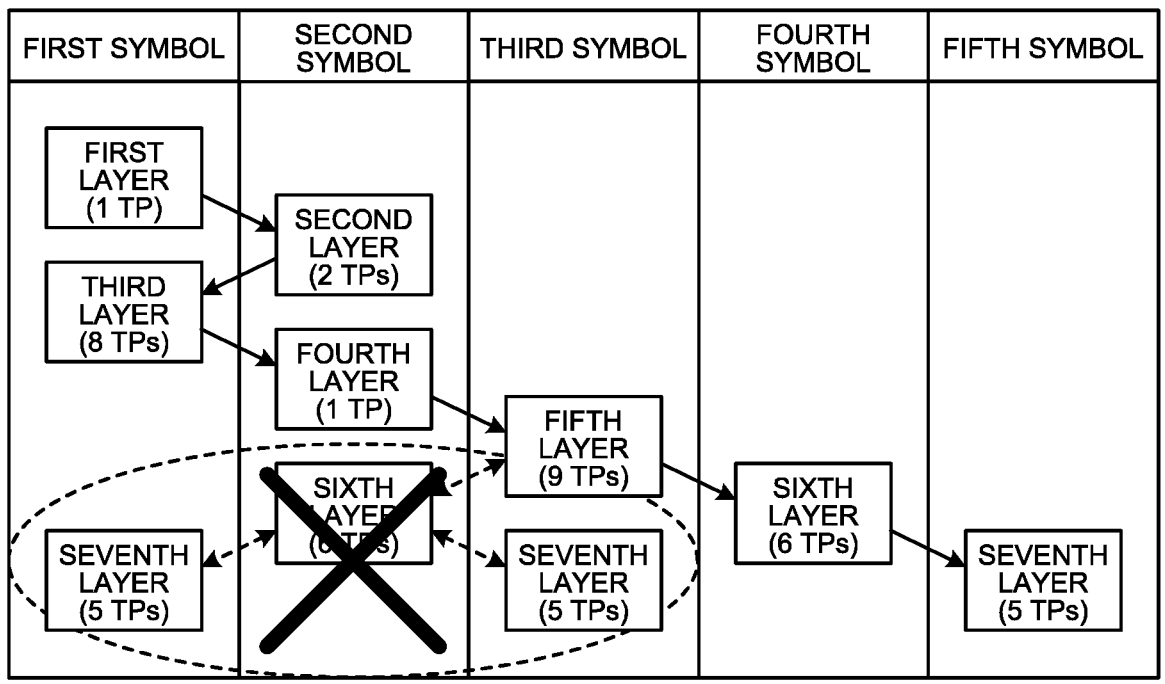
FIG. 11 is a diagram illustrating a specific example of allocation of radio resources according to a fifth embodiment.

FIG. 11 is a diagram illustrating a specific example of allocation of radio resources according to the fifth embodiment. FIG. 11 illustrates an example in which the radio resource allocating unit 254 allocates the radio resources (OFDM symbols) to the TPs belonging to the layers illustrated in FIG. 10. In FIG. 11, the value indicating the number of resources other than those in the time domain which can be multiplexed in the same symbol is assumed to be 10. In other words, the upper limit value of a total of the number of TPs to which one symbol is allocated is assumed to be 10.

As illustrated in FIG. 11, the radio resource allocating unit 254 switches the layer in order from the first layer, and one radio resource is assumed to be allocated to the TP 110 belonging to the layer after the switching each time the layer is switched. Then, the radio resource allocating unit 254 determines whether or not a total of the number of the TPs 110 to which one radio resource is allocated from the higher layer to the layer after the switching is the upper limit value (that is, 10) or less.

Then, in a case in which a total of the number of TPs 110 is the upper limit value (that is, 10) or less, the radio resource allocating unit 254 further performs the following condition determination on the lower layer adjacent to the layer after the switching. In other words, the radio resource allocating unit 254 is assumed to allocate other radio resources which are consecutive to the one radio resource on the time axis in a forward direction or a reverse direction to the TP 110 belonging to the lower layer adjacent to the layer after the switching. Then, the radio resource allocating unit 254 determines whether or not a total of the number of TPs 110 to which other radio resources are allocated from the higher layer to the lower layer is the upper limit value (that is, 10) or less. Then, in a case in which a total of the number of TPs 110 to which other radio resources are allocated is the upper limit value (that is, 10) or less, the radio resource allocating unit 254 allocates the one radio resource to the TP 110 belonging to the layer after the switching. In the example illustrated in FIG. 11, a total of the number of TPs 110 to which the first symbol is allocated from the first layer of the higher layer to the third layer is 9 which is lower than the upper limit value (that is, 10), and the condition of the lower layer is satisfied. Therefore, the first symbol is allocated to the TPs 110 of the first layer and the third layer. Further, a total of the number of TPs 110 to which the second symbol is allocated from the second layer of the higher layer to the fourth layer is 3 which is lower than the upper limit value (that is, 10), and the condition of the lower layer is satisfied. Therefore, the second symbol is allocated to the TPs 110 of the second layer and the fourth layer.

On the other hand, in a case in which a total of the number of the TPs 110 exceeds the upper limit value, the radio resource allocating unit 254 allocates unallocated radio resources which are consecutive to the radio resources allocated to the TP 110 of the higher layer adjacent to the layer after the switching on the time axis to the TPs 110 belonging to the layer after the switching.

In the example illustrated in FIG. 9, if the first symbol is assumed to be allocated to the fifth layer, a total of the number of TPs 110 to which the first symbol is allocated from the first layer of the higher layer to the fifth layer is 18 which exceeds the upper limit value (that is, 10). For this reason, in the example illustrated in FIG. 11, the unallocated third symbol which is consecutive to the second symbol allocated to the TP 110 of the fourth layer of the higher layer adjacent to the fifth layer on the time axis is allocated to the TP 110 of the fifth layer.

Further, in the example illustrated in FIG. 11, a total of the number of the TPs 110 to which the second symbol is allocated from the second layer of the higher layer to the sixth layer is 9 which is lower than the upper limit value (that is, 10). Therefore, the first symbol or the third symbol which is consecutive to the second symbol on the time axis in the forward direction or the reverse direction is assumed to be allocated to the TP 110 belonging to the seventh layer of the lower layer adjacent to the sixth layer after the switching. Thus, a total of the number of TPs 110 to which the first symbol is allocated from the first layer of the higher layer to the seventh layer is 14 which exceeds the upper limit value (that is, 10). Further, a total of the number of TPs 110 to which the third symbol is allocated from the fifth layer of the higher layer to the seventh layer is 14 which exceeds the upper limit value (that is, 10). Therefore, since the condition of the lower layer is not satisfied, the allocation of the second symbol to the TP 110 of the sixth layer after the switching is canceled. Then, the unallocated fourth symbol which is consecutive to the third symbol allocated to the TP 110 belonging to the fifth layer of the higher layer adjacent to the sixth layer after the switching is allocated to the sixth layer after the switching. Accordingly, radio resources (symbols) which are used for the transmission and reception of the CAL signal and consecutive on the time axis are allocated to the TPs belonging to the adjacent layers.

Figure 12:
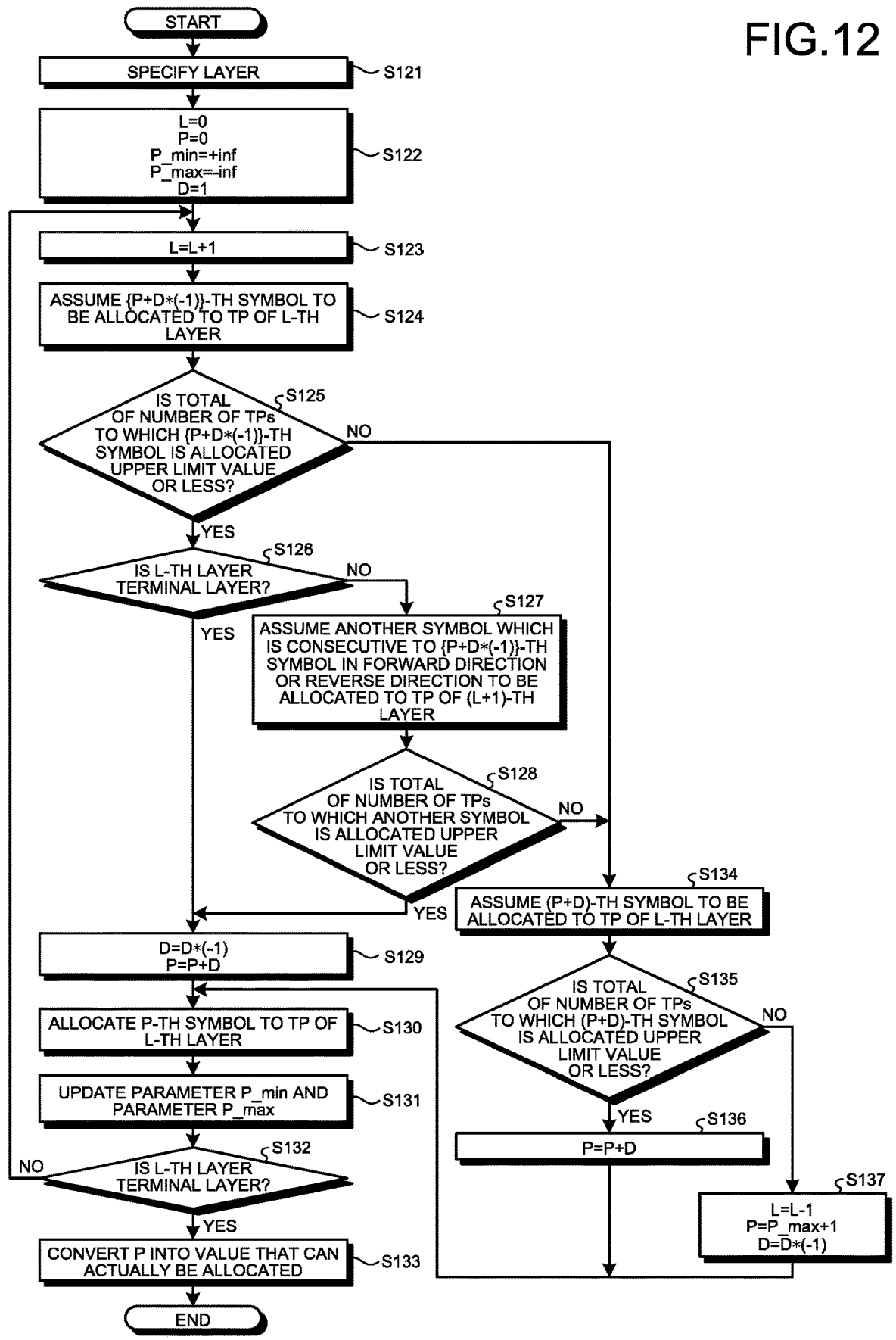
FIG. 12 is a flowchart illustrating a radio resource allocation process according to the fifth embodiment.
Figure 13:
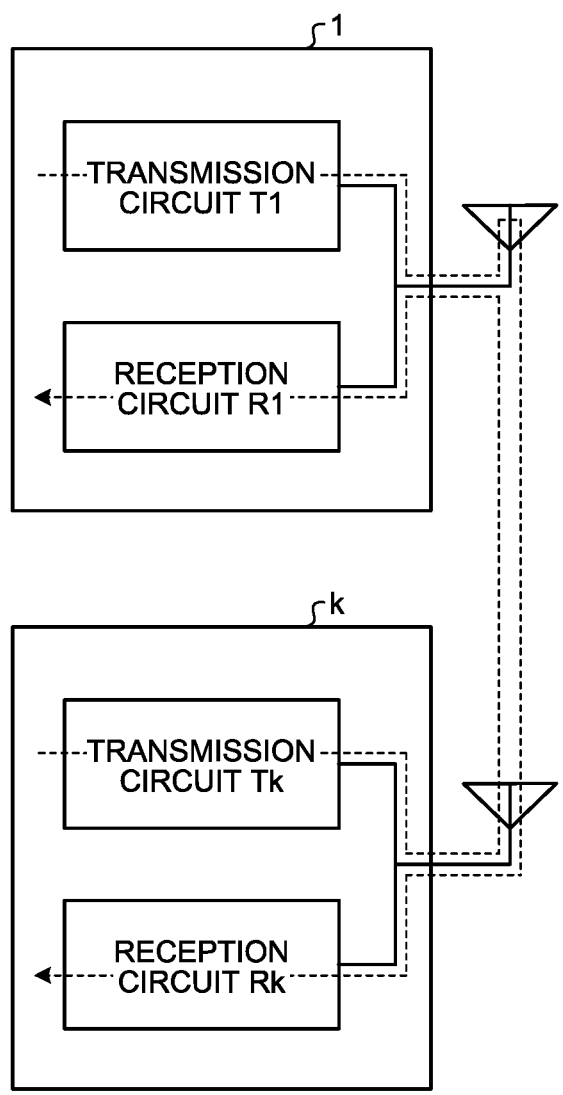
FIG. 13 is a diagram for describing calibration.

Next, the radio resource allocation process according to the fifth embodiment will be described with reference to a flow chart illustrated in FIG. 12. FIG. 12 is a flowchart illustrating the radio resource allocation process according to the fifth embodiment. The radio resource allocation process illustrated in FIG. 12 is mainly executed by the radio resource allocating unit 254. The radio resource allocation process illustrated in FIG. 12 corresponds to Step S104 illustrated in FIG. 6.

First, the layers corresponding to the number of hops of the CAL link are specified (Step S121). Here, the layers illustrated in FIG. 10 (the first to seventh layers) are assumed to be specified.

In a case in which the layers are specified, various kinds of parameters used for allocation of the radio resources are initialized (Step S122). In this case, a parameter L indicating the layer of a radio resource allocation target is initialized to 0, and a parameter P indicating a position on the time axis of the OFDM symbol allocated to a TP 110 of an L-th layer is initialized to 0. Further, a parameter P_min indicating a position on the time axis of the OFDM symbol positioned at the leading end among the allocated OFDM symbols is initialized to positive infinity. Further, a parameter P_max indicating a position on the time axis of the OFDM symbol positioned at the terminal end among the allocated OFDM symbols is initialized to negative infinity. Further, a parameter D indicating a direction in which the OFDM symbol is shifted in an L-th layer is initialized to 1.

Then, the parameter L is incremented (Step S123). In this case, since the parameter L is incremented to 1, the layer of the allocation target is switched to the first layer.

Then, a {P+D (−1)}-th symbol is assumed to be allocated to the TP 110 of the L-th layer (here, the TP 110 of the first layer) (Step S124). Then, it is determined whether or not a total of the number of TPs 110 to which the {P+D (−1)}-th symbol is allocated is the upper limit value (that is, 10) or less (Step S125). In a case in which a total of the number of TPs 110 to which the {P+D (−1)}-th symbol is allocated is the upper limit value (that is, 10) or less as a result of the determination (Step S125 Yes), it is determined whether or not the L-th layer is the terminal layer (that is, the seventh layer) (Step S126). In a case in which the L-th layer is the terminal layer (that is, the seventh layer) as a result of the determination (Step S126 Yes), the parameter D and the parameter P are updated so that the {P+D (−1)}-th symbol is allocated to the TP 110 of the L-th layer (Step S129).

Here, since the L-th layer is the first layer, a total of the number of the TPs 110 to which the {P+D (−1)}-th symbol is allocated is 1 which is lower than the upper limit value (that is, 10) (Step S125 Yes), and the L-th layer is not the terminal layer (Step S126 No). Therefore, in order to perform the condition determination related to an (L+1)-th layer which is the lower layer, another symbol which is consecutive to the {P+D (−1)}-th symbol in the forward direction or the reverse direction is assumed to be allocated to the TP 110 of the (L+1)-th layer (Step S127). In other words, another symbol which is consecutive to the {P+D (−1)}-th symbol in the forward direction or the reverse direction on the time axis is assumed to be allocated to the TP 110 of the (L+1)-th layer which is the lower layer adjacent to the L-th layer. Then, it is determined whether or not a total of the number of TPs 110 to which another symbol is allocated is the upper limit value (that is, 10) or less (Step S128). In a case in which a total of the number of the TPs 110 to which another symbol is allocated is the upper limit value (that is, 10) or less as a result of the determination (Step S128 Yes), the parameter D and the parameter P are updated so that the {P+D (−1)}-th symbol is allocated to the TP 110 of the L-th layer (Step S129).

If the parameter D and the parameter P are updated, a P-th symbol is allocated to the TP 110 of the L-th layer on the basis of the updated parameter P (Step S130). At this time, resources other than those in the time domain which can be multiplexed in the P-th symbol may be allocated to the TP 110 of the L-th layer together with the P-th symbol.

Then, the parameter P_min and the parameter P_max indicating the positions on the time axis of the OFDM symbols positioned at the leading end and the terminal end among the allocated OFDM symbols are updated on the basis of the updated parameter P (Step S131). In other words, in a case in which the updated parameter P is smaller than the parameter P_min, the updated parameter P is substituted into the parameter P_min. Further, in a case in which the updated parameter P is larger than the parameter P_max, the updated parameter P is substituted into the parameter P_max.

If the parameter P_min and the parameter P_max are updated, it is determined whether or not the L-th layer is the terminal layer (that is, the seventh layer) (Step S132). In a case in which the L-th layer is the terminal layer (that is, the seventh layer) as a result of the determination (Step S132 Yes), the parameter P is converted into a value that can actually be allocated (Step S133), and the radio resource allocation process ends. For example, a case in which the parameter P is {P_min, P_min+1, P_min+2, . . . , P_max}, and the actually allocatable values are {1, 2, 3, . . . } is assumed. In this case, if the parameter P is a negative value, the parameter P deviates from the actually allocatable value. Therefore, after the parameter P is converted so that P_min=1 is held, the radio resource allocation process ends.

On the other hand, in a case in which the L-th layer is not the terminal layer (that is, the seventh layer) (Step S132 No), the parameter L is incremented, and the layer of the allocation target is switched (Step S123), and the process of Steps S123 to S132 is repeated. In other words, until the layer of the allocation target reaches the fourth layer, the condition of the layer of the allocation target is satisfied, and the condition of the lower layer is satisfied (Step S125 Yes and Step S128 Yes). Therefore, the first symbol or the second symbol is allocated to the TP 110 of the L-th layer as the P-th symbol.

In a case in which a total of the number of TPs 110 to which the {P+D (−1)}-th symbol is allocated exceeds the upper limit value (that is, 10) (Step S125 No), a (P+D)-th symbol is assumed to be allocated to the TP 110 of the L-th layer (Step S134). Then, it is determined whether or not a total of the number of TPs 110 to which the (P+D)-th symbol is allocated is the upper limit value (that is, 10) or less (Step S135). In a case in which a total of the number of TPs 110 to which the (P+D)-th symbol is allocated is the upper limit value (that is, 10) or less as a result of the determination (Step S135 Yes), the parameter P is updated so that the (P+D)-th symbol is allocated to the TP 110 of the L-th layer (Step S136).

If the parameter P is updated, the P-th symbol is allocated to the TP 110 of the L-th layer on the basis of the updated parameter P (Step S130). For example, a case in which the layer of the allocation target (that is, the L-th layer) is the fifth layer is assumed. In this case, since a total of the number of TPs 110 to which the first symbol is allocated from the first layer of the higher layer to the fifth layer is 18 which exceeds the upper limit value (that is, 10), the condition of the layer of the allocation target is not satisfied (Step S125 No). Therefore, in this case, if the parameter P is updated to 3 (Step S136), the unallocated third symbol which is consecutive to the second symbol allocated to the TP 110 of the fourth layer of the higher layer adjacent to the fifth layer is allocated to the TP 110 of the fifth layer.

Further, in a case in which a total of the number of TPs 110 to which another symbol is allocated exceeds the upper limit value (that is, 10) (Step S128 No), the allocation of the {P+D (−1)}-th symbol to the TP 110 of the L-th layer is canceled, and the process of Steps S135 and S136 is performed. For example, a case in which the layer of the allocation target (that is, the L-th layer) is the sixth layer is assumed. In this case, the allocation of the second symbol to the TP 110 of the sixth layer is canceled. Then, if the parameter P is updated to 4 (Step S136), the unallocated fourth symbol which is consecutive to the third symbol allocated to the TP 110 belonging to the fifth layer of the higher layer adjacent to the sixth layer on the time axis is allocated to the sixth layer after the switching.

Then, in a case in which a total of the number of TPs 110 to which the (P+D)-th symbol is allocated exceeds the upper limit value (that is, 10) (Step S135 No), since all the conditions for allocating the symbols are not satisfied, the following processing is performed. In other words, the parameter L, the parameter P, and the parameter D are updated so that an unallocated (P_max+1)-th symbol is allocated to the TP 110 of the (L−1)-th layer in addition to the already allocated symbol (Step S137).

As described above, according to the present embodiment, in addition to the condition determination related to the layer of the radio resource allocation target, the condition determination related to the lower layer adjacent to the layer of the radio resource allocation target is performed. Further, in a case in which the condition related to the lower layer is not satisfied, the unallocated radio resources are allocated to the TP 110 of the layer of the radio resource allocation target. Accordingly, since the opportunities for allocating the two radio resources to one TP can be reduced as much as possible, the waste of radio resources can be further suppressed accordingly.

According to one aspect of a transmission control device disclosed in the present application, there is an effect in that it is possible to perform calibration between transmission points with a high degree of accuracy while suppressing the waste of the radio resources.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission control device comprising:
  a memory; and
  a processor connected to the memory and configured to:
    specify layers corresponding to a number of hops of a link generated between a plurality of transmission points each of which wirelessly transmits a signal; and
    allocate radio resources which are used for transmission and reception of the signal and consecutive on a time axis to transmission points belonging to adjacent layers while sequentially switching the specified layers.

2. The transmission control device according to claim 1, wherein the processor is further configured to:
  cause the plurality of transmission points to perform transmission and reception of a calibration signal as the signal using radio resources allocated to the plurality of transmission points, and
  calculate a calibration coefficient for calibrating a difference in transmission characteristics of transmission circuits and reception circuits installed in the plurality of transmission points on the basis of a channel estimation result using the calibration signal.

3. The transmission control device according to claim 1, wherein the processor is further configured to alternately allocate a plurality of radio resources corresponding to a number of the specified layers to transmission points belonging to odd-numbered layers and transmission points belonging to even-numbered layers.

4. The transmission control device according to claim 1, wherein the processor is further configured to allocate one radio resource out of two radio resources which are used for transmission and reception of the signal and consecutive on a time axis to transmission points belonging to odd-numbered layers and allocate the other radio resource out of the two radio resources to transmission points belonging to even-numbered layers.

5. The transmission control device according to claim 1, wherein the processor is further configured to:
  assume that radio resources used for transmission and reception of the signal are allocated to a transmission point of a corresponding layer for each of the specified layers and determine whether or not a total of a number of transmission points to which the radio resources are allocated from a higher layer to the corresponding layer is an upper limit value or less,
  allocate the radio resources to the transmission points belonging to the corresponding layer in a case in which the total of the number of transmission points to which the radio resources are allocated is the upper limit value or less, and
  allocate unallocated radio resources which are consecutive to the radio resources allocated to a transmission point belonging to a higher layer adjacent to the corresponding layer on a time axis to a transmission point belonging to the corresponding layer in a case in which the total of the number of transmission points to which the radio resources are allocated exceeds the upper limit value.

6. The transmission control device according to claim 5, wherein the processor is further configured to allocate unallocated radio resources to the transmission point belonging to the higher layer adjacent to the corresponding layer in addition to the allocated radio resources in a case in which the total of the number of transmission points to which the radio resources are allocated exceeds the upper limit value.

7. The transmission control device according to claim 5, wherein the processor is further configured to:
  in a case in which the total of the number of transmission points to which the radio resources are allocated is the upper limit value or less, assume that other radio resources which are consecutive to the radio resources on the time axis in a forward direction or a reverse direction are allocated to a transmission point belonging to a lower layer adjacent to the corresponding layer and determine whether or not a total of a number of transmission points to which the other radio resources are allocated from a higher layer to the lower layer is the upper limit value or less, allocate the radio resources to the transmission points belonging to the corresponding layer in a case in which the total of the number of transmission points to which the other radio resources are allocated is the upper limit value or less, and allocate unallocated radio resources which are consecutive to the radio resources allocated to a transmission point belonging to a higher layer adjacent to the corresponding layer on a time axis to a transmission point belonging to the corresponding layer in a case in which the total of the number of transmission points to which the other radio resources are allocated exceeds the upper limit value.

8. The transmission control device according to claim 5, wherein the upper limit value is a value indicating a number of resources other than resources in a time domain which are able to be multiplexed in the same radio resources.

9. A radio communication system comprising:
a transmission control device; and
a plurality of transmission points connected to the transmission control device,
wherein the transmission control device includes
a memory, and
a processor connected to the memory and configured to:
specify layers corresponding to a number of hops of a link generated between a plurality of transmission points each of which wirelessly transmits a signal, and
allocate radio resources which are used for transmission and reception of the signal and consecutive on a time axis to transmission points belonging to adjacent layers while sequentially switching the specified layers, wherein each of the plurality of transmission points includes a transmission circuit that executes a radio transmission process on a calibration signal and transmits the calibration signal which has undergone the radio transmission process as the signal using the radio resources allocated at the allocating, and a reception circuit that receives the calibration signal as the signal using the radio resources allocated at the allocating and executes a radio reception process on the received calibration signal.

10. A radio resource allocation method comprising:

specifying layers corresponding to a number of hops of a link generated between a plurality of transmission points each of which wirelessly transmits a signal, and allocating radio resources which are used for transmission and reception of the signal and consecutive on a time axis to transmission points belonging to adjacent layers while sequentially switching the specified layers.

* * * * *